United States Patent Office 3,006,627
Patented Oct. 31, 1961

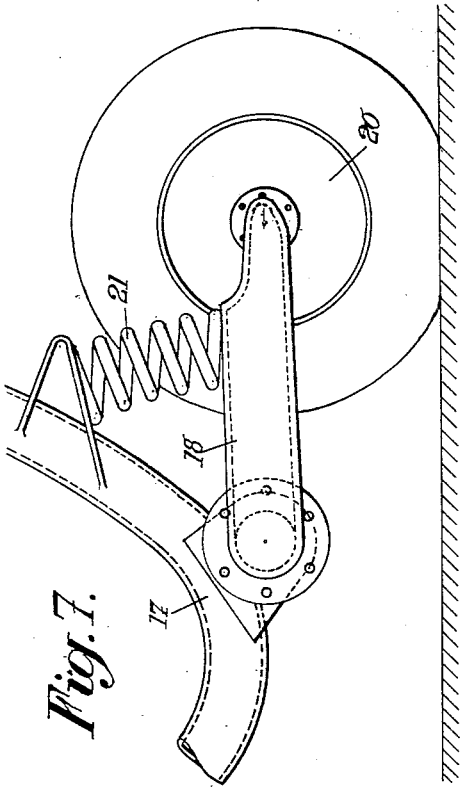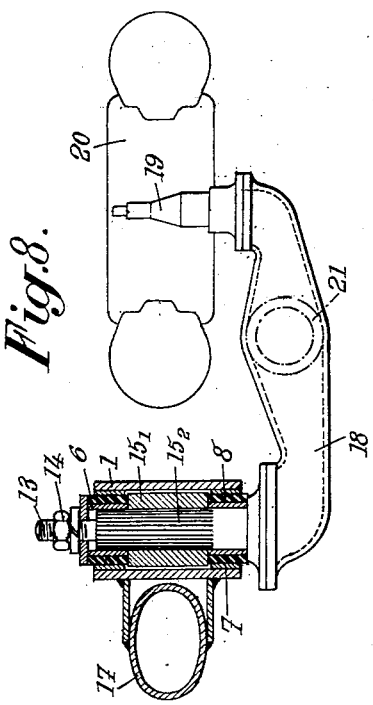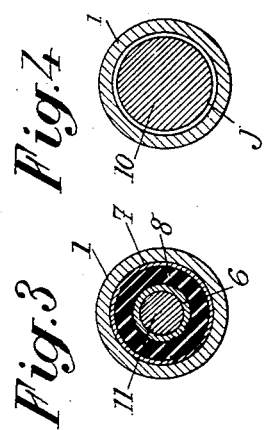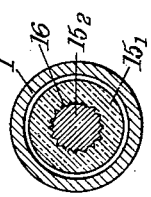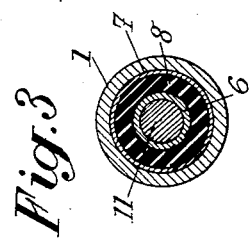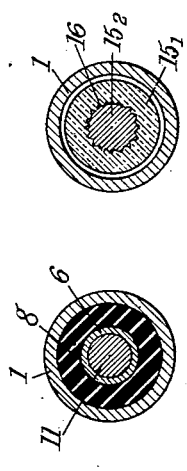

3,006,627
DAMPING APPARATUS, PARTICULARLY OF THE ARTICULATED TYPE, FOR SUSPENSION SYSTEMS OR OTHER OSCILLATING ASSEMBLIES
Jean-Felix Paulsen, Paris, France, assignor to Societe Luxembourgeoise de Brevets et de Participations, Luxembourg, a Luxembourg societe
Filed June 24, 1957, Ser. No. 667,333
Claims priority, application France June 25, 1956
1 Claim. (Cl. 267—57.1)

The present invention relates to damping apparatus for suspension systems or other oscillating assemblies and comprising facing surfaces arranged to move relatively to one another, and relates more particularly, but not exclusively, to damping apparatus of the articulated type adapted to participate in the relative oscillations of coaxial members of said systems or assemblies.

The object of the invention is to provide damping apparatus which responds better than hitherto to the various desiderata of practice, particularly by improving the damping power thereof.

According to the invention there is provided damping apparatus for suspension systems or other oscillating assemblies comprising facing surfaces which move relatively to one another, particularly for articulated joints participating in relative oscillations of coaxial members about their axis of revolution, on either side of a mean position, characterized in that a fluid and viscous material is interposed in the interstices of relatively small thickness separating the said facing surfaces, which material tends to stick to the said surfaces, and is capable, under the rolling effect resulting from relative displacements of these surfaces, of braking the said displacements and thus damping their oscillations. The viscous material may be formed by at least one polymer obtained from an organic monomer, the molecular structure of which has only one double bond and preferably by polyisobutylenes with a molecular weight between 5,000 and 25,000.

In addition to this main arrangement, the invention comprises certain other features which are more fully discussed hereinafter.

For connecting the wheels or axles of vehicles to their chassis or suspended parts, it is known to use arms or triangular members which are mounted to the chassis by means of elastic articulated joints and which generally co-operate with an elastic suspension system (although with small vehicles the said elastic articulated joints themselves sometimes serve the purpose of the elastic suspension).

These articulated joints include an external and an internal rigid (usually metal) cylindrical sleeve, and an annular block of rubber or similar elastic material interposed between the two sleeves, the rubber adhering strongly, for example by vulcanization, to the two rigid sleeves. The external sleeve is for example connected fast to the vehicle chassis and the internal sleeve is connected to the member (triangular member or arm) connecting the wheel or axle to the chassis. The connecting member can oscillate with respect to the chassis and therefore the internal sleeve can oscillate with respect to the external sleeve, thereby causing the rubber to work elastically with torsion on either side of the mean position of oscillation.

The damping of the oscillation of these articulated joints is due solely to the intramolecular friction of the rubber, and this friction is frequently inadequate.

In order to increase this damping action or more generally the damping of an analogous oscillating movement, there is employed according to the invention a viscous substance disposed in interstices of relatively small thickness provided between facing surfaces formed by co-operating fixed and movable members in the articulated connection, the substance tending to stick to the facing surfaces and, due to the relative movement of the two surfaces, being thereby subjected to a rolling or flattening action providing resistance to relative movement between the two members.

In order to form the interstices in the aforementioned articulated connections, a cylinder of revolution coaxial with the internal sleeve is advantageously made fast with the internal sleeve and mounted in a corresponding cylinder secured to the external sleeve, a very small clearance, for example between approximately $5/100$ and a few $1/10$ of a millimetre, being provided between these two cylinders and constituting the said interstices.

The filling substance must remain viscous and unbroken at all times in spite of the movements and stresses to which it is subjected by the facing surfaces to which it adheres naturally. The viscous substance is thus subjected by oscillations of the arrangement to alternate rolling or shearing stresses accompanied by the formation of tangential forces, which tend to brake and thus to damp the oscillations.

Such an adhering viscous substance can be formed by polymers obtained from monomers, such as the ethylene carbides, $C_nH_{2n}$, which have only one double bond, or by mixtures of these polymers.

Among these polymers, it is found that the polyisobutylenes having a molecular weight between approximately 5,000 and 25,000, or mixtures of these products in varying proportions with polyisobutylenes of an even higher molecular weight of the order of 80,000, are particularly suited for the purpose, in that by the friction of their viscous shearing action, they develop damping forces considerably higher than those caused by the intramolecular friction of rubbers or elastomers which are usually employed in certain articulated connections and which are preferably included in the arrangement according to the invention.

Embodiments of the invention will now be described by way of example with reference to the accompanying drawings, in which:

FIGS. 3 and 4 are partial transverse sections taken on the lines III-III and IV-IV of FIG. 2, respectively.

FIGS. 5 and 6 are modifications of the sections of FIGS. 3 and 4, respectively.

FIGS. 7 and 8 are respectively an elevation and a partial section along the plane of the rotational axis of a suspension arm of a motor cycle wheel.

The embodiments hereinafter described relate to the suspension of vehicle wheels, but it is to be understood that this description has no limitative or restrictive character and that furthermore it will be possible for the damping apparatus according to the invention to be applied, without departing from the scope thereof, to any other arrangement comprising members which are oscillating or reciprocating relatively to one another and which are separated by a very small clearance, even if the said members are not coaxial or their movement is not rotational.

In the embodiments which are described, two elastic rubber-metal joints such as described above operate coaxially at a certain distance from one another, and damping apparatus which forms the subject of the invention is inserted between the two joints.

Figure 1:
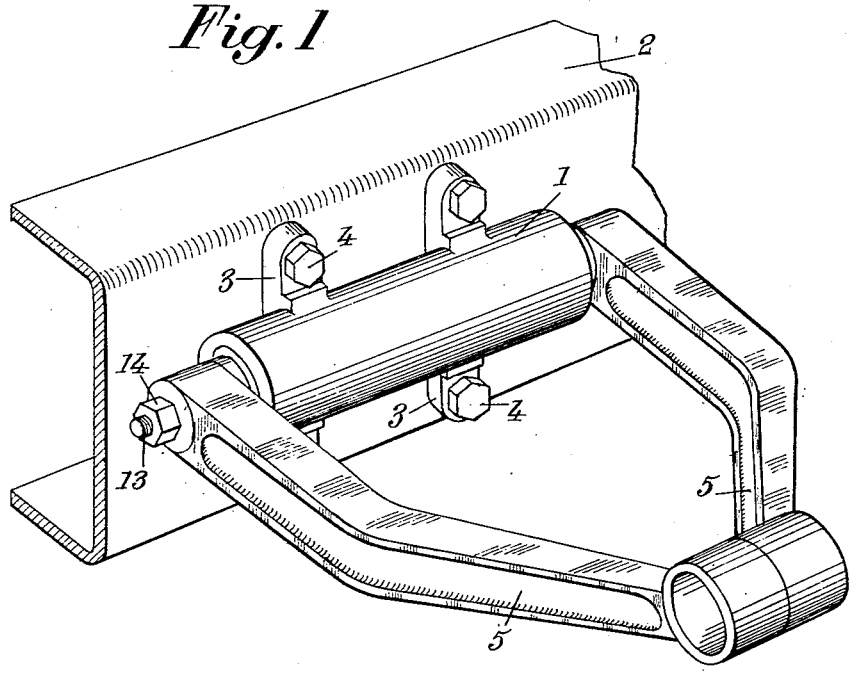
FIG. 1 is a perspective view of a triangular member connecting a wheel to the chassis of a vehicle, the said triangular member being pivoted to the chassis.
Figure 2:
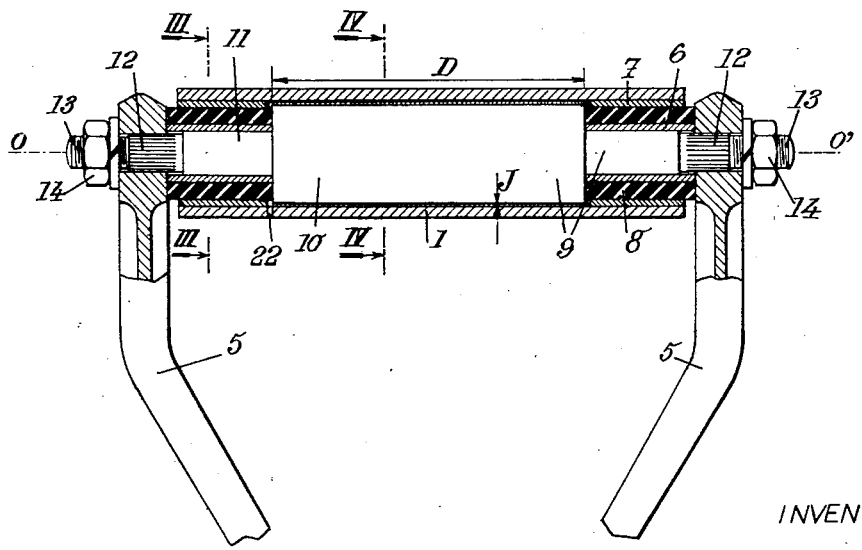
FIG. 2 is a partial section of the triangular member shown in FIG. 1 along the pivot axis.

In the embodiment of FIG. 1, a casing 1 formed with a cylindrical bore having an axis OO' is connected to a vehicle chassis 2 by lugs 3 and bolts 4. The casing 1 provides a support for one of the sides of a triangle member and two arms 5 which form the other sides of this triangle and which are connected to a wheel or axle of the vehicle, are mounted so as to be able to oscillate together about the axis OO' of the casing 1. Two elastic articulated joints are disposed at the two ends of the cylindrical bore, of the casing 1, these joints each comprising two rigid coaxial sleeves 6, 7 the internal sleeve 6 and the external sleeve 7 being connected by an annular block 8 of rubber intimately vulcanized to the facing surfaces of the two sleeves. Although the annular block 8 of FIG. 1 is made of rubber, it may be made of similar elastic material and arranged to adhere intimately to the facing surfaces of the two sleeves.

The external sleeves 7 are a force fit in the ends of the bore in the casing 1 and the joints are made sufficiently short with respect to the length of the bore to leave a relatively large free space D between them.

A pivot element 9 having a relatively large central cylindrical portion 10 and two cylindrical end portions 11 of reduced diameter is positioned within the cylindrical bore of the casing 1, the portion 10 lying between the two elastic joints and the portions 11 extending out through the sleeves 6. The external diameter of the portion 10 is only slightly smaller than that of the cylindrical bore in the casing 1 so that an interstice or clearance J of small value exists between the central portion 10 and the surface of the cylindrical bore, and the end portions 11 of the element 9 are a force fit within the sleeves 6. The end portions 11 each comprise a knurled or toothed portion 12, on which are fitted the ends of the oscillating arms 5, and a threaded portion 13. Nuts 14, screwed on the threaded portion 13, clamp the arms 5 against the internal sleeves 6 which are longer than the external sleeves 7, and also clamp the internal sleeves 6 themselves against the shoulders of the central portion 10 of the element 9 so that the arms 5, the internal sleeves 6 and the element 9 form an integral unit mounted for angular movement about the axis OO'.

The very small clearance J (from $5/100$ to a few $1/10$ of a millimetre) existing between the central portion 10 of the element 9 and the cylindrical bore of the casing 1 is filled with an adhesive substance such as that indictated above, which always remains viscous and unbroken, whatever may be the shearing forces and the stationary periods to which it may be subjected.

The operation of the arrangement of FIG. 1 is as follows:

When the arms 5 oscillate about the axis OO' as a result of displacements of the unsuspended member (wheel or axle) which supports their common ends, they drive the element 9 which then oscillates relatively to the casing 1.

The first effect of this movement is that the internal sleeves 6 which are a force fit on the end portions 11 of the element 9 are caused to oscillate with respect to the external sleeves 7, thereby generating an alternating torsion on the annular rubber block 8 which separates them; secondly, the central portion 10 of the element 9 is angularly displaced relatively to the casing 1, thereby subjecting the viscous film separating it from the casing to intense shearing forces, the effect of which is to brake and thus to damp the oscillatory movement of the arms 5 and consequently of the wheel or axle supporting them.

This damping effect is added to that of the intramolecular friction in the rubber block 8 and considerably improves the same.

FIG. 5 is a transverse section showing a modification of the elastic articulated joint of FIGS 1–4, in which the external sleeve 7 has been omitted, the casing 1 then acting as such. It is of course always necessary for the annular rubber block 8 to be fitted with force in the ends of the bore of the casing 1, thus making it necessary for the external diameter of block 8 to be initially slightly larger than the cylindrical bore.

As shown in FIG. 6, which is a transverse section of a modification of the element 9, the central portion 10 of the element 9 can conveniently be formed by a sleeve $15_1$ of a material which may or may not be different from that forming the end portions of the element 9, and united by molding or any other process to a central core $15_2$ which advantageously has the same diameter as the end portions, the said end portions being then themselves formed by extensions of the core on either side of the sleeve $15_1$. It is of course necessary in this case to rigidly secure the sleeve $15_1$ to the core $15_2$ for rotation therewith, for example by means of driving grooves or teeth 16 formed on the periphery of the central core $15_2$.

In the embodiment of FIGS. 7 and 8 the well-damped articulated joint forming the subject of the invention is used for mounting a wheel-suspension arm in oscillating manner on the chassis of a motorized cycle or a scooter.

To this end, the casing 1 is secured to the chassis 17 of the motorized cycle and the pivot element 9 is connected at one end only to one end of an arm 18, the other end of the arm 18 carrying the spindle 19 of one of the wheels 20 of the motorised cycle. The arm 18, which is thus mounted for oscillation about the pivot element 9, co-operates with a helical compression spring 21 to ensure a thoroughly damped suspension of the vehicle.

The viscous substance may be forced under pressure into the thin space or clearance J provided between the central portion 10 of the element 9 and the casing 1, but the surfaces actually defining the clearance J are preferably soaked in the substance and then allowed to drip and/or dry for a sufficient time to form on each of the surfaces a layer of viscous substance having a thickness just slightly greater than half the clearance J: so that, on subsequent assembly of the various members, it is certain on the one hand that the clearance J will be completely filled in a homogeneous manner by the substance and secondly that losses of the substance by extrusion upon assembly will be reduced to a minimum.

Small holes 22 (FIG. 2) are preferably formed in the surface of the casing adjacent the ends of the space D, so that on assembly the air occluded between the elastic joints and the element 9 coated with its viscous sheath can escape, the holes 22 being closed after assembly to prevent escape of the fluid substance and any harmful introduction of foreign substances into the interior of the casing.

Accordingly, whichever embodiment is adopted, there is finally obtained an articulated joint, the operation and advantages (particularly the excellent damping action), of which will be seen sufficiently clearly from the foregoing description.

As will be obvious and as will moreover be apparent from the foregoing, the invention is not in any way limited to those of its applications or to those embodiments of its various parts which have been more especially considered; on the other hand, it covers all the modifications thereof, particularly those where the damping by rolling and shearing of viscous liquid would not be used concurrently with a damping by torsion of a rubbery mass.

What I claim is:

Damping apparatus for an oscillating assembly comprising a sleeve member defining a cylindrical bore, a cylindrical member disposed coaxially in the bore and having its central portion spaced from the sleeve member by an annular clearance of about $5/100$ to $3/10$ millimeter and having end portions of greatly reduced diameter relative to said central portion thereof, means mounting the cylindrical member and the sleeve member for relative rotation in response to oscillation of the assembly including resilient means tightly engaged between the sleeve member and said end portions of the cylindrical member whereby the members are relatively movable transverse one another, and a fluid material consisting essentially of polyisobutylenes having a molecular weight of about 5,000–80,000 disposed in said clearance to damp the rotational and transverse movements of the members.

References Cited in the file of this patent

UNITED STATES PATENTS

| | | |
|---|---|---|
| 2,169,335 | Best | Aug. 15, 1939 |
| 2,532,656 | Backus et al. | Dec. 5, 1950 |
| 2,621,923 | Krotz | Dec. 16, 1952 |
| 2,699,846 | Pitman et al. | Jan. 18, 1955 |
| 2,775,317 | Sinesterra | Dec. 25, 1956 |
| 2,795,844 | Liszak | June 18, 1957 |
| 2,824,734 | Linn et al. | Feb. 25, 1958 |
| 2,842,840 | Ploetz | July 15, 1958 |
| 2,859,624 | Carter | Nov. 11, 1958 |

FOREIGN PATENTS

| | | |
|---|---|---|
| 364,310 | Great Britain | Jan. 7, 1932 |